US010948097B2

(12) United States Patent
Dörfler et al.

(10) Patent No.: US 10,948,097 B2
(45) Date of Patent: Mar. 16, 2021

(54) VALVE ASSEMBLY AND PUMP WITH INTEGRATED VALVE FOR LUMBAR SUPPORT

(71) Applicant: Alfmeier Präzision SE, Treuchtlingen (DE)

(72) Inventors: Erich Dörfler, Landsberg (DE); Ronny Gehlmann, Allersberg (DE); Helmut Auernhammer, Höttingen (DE); Matthias Mitzler, Graben (DE)

(73) Assignee: Akfmeier Präzision SE, Treuchtlingen (DE)

( * ) Notice: Subject to any disclaimer, the term of this patent is extended or adjusted under 35 U.S.C. 154(b) by 35 days.

(21) Appl. No.: 16/413,844

(22) Filed: May 16, 2019

(65) Prior Publication Data

US 2019/0353268 A1 Nov. 21, 2019

(30) Foreign Application Priority Data

May 18, 2018 (DE) ...................... 10 2018 112 091.5

(51) Int. Cl.
*F16K 31/00* (2006.01)
*B60N 2/90* (2018.01)

(52) U.S. Cl.
CPC ............ *F16K 31/002* (2013.01); *B60N 2/914* (2018.02); *B60N 2/976* (2018.02)

(58) Field of Classification Search
CPC ...... F16K 31/002; F16K 31/025; F16K 31/02; F16K 99/0038; B60N 2/914; B60N 2/976; B60N 2/665
See application file for complete search history.

(56) References Cited

U.S. PATENT DOCUMENTS 3,442,483 A * 5/1969 Schwartz ........... G05D 23/1921
251/11
4,494,692 A * 1/1985 Dobias .................. F16K 31/002
137/183

(Continued)

FOREIGN PATENT DOCUMENTS

CN 106461093 A 2/2017
CN 207089062 U 3/2018

(Continued)

OTHER PUBLICATIONS

German Patent and Trademark Office, Office Action dated Apr. 16, 2020, with English Translation.

(Continued)

*Primary Examiner* — Michael R Reid
(74) *Attorney, Agent, or Firm* — JK Intellectual Property Law, PA (57) ABSTRACT

A valve arrangement includes a housing with pump and consumer connections, and first and second actuators arranged symmetrically. Each first and second actuator includes one base plate; one actuating element having first and second end sections, and a sealing element in the first end section; one connecting element; and one SMA element having a U-shape with first and second ends, and a middle section between the ends. The actuating element is at least partially arranged on and connected to the base plate via the second end section. The connecting element is conductively connected to two points of the SMA element. The middle section is connected to the first end section of the actuating element so that shortening the SMA element causes a stroke of the sealing element. A related pump mechanism is disclosed.

18 Claims, 7 Drawing Sheets

(56) References Cited

U.S. PATENT DOCUMENTS

| | | | | |
|---|---|---|---|---|
| 4,769,887 | A * | 9/1988 | Shopsky | F16K 31/002 |
| | | | | 29/453 |
| 10,107,410 | B2 * | 10/2018 | Dankbaar | B60N 2/914 |
| 2007/0023089 | A1 | 2/2007 | Beyerlein | |
| 2011/0227388 | A1 | 9/2011 | Bocsanyi et al. | |
| 2016/0363230 | A1 | 12/2016 | Dankbaar et al. | |
| 2019/0353270 | A1 * | 11/2019 | Dorfler | F16K 31/02 |

FOREIGN PATENT DOCUMENTS

| | | |
|---|---|---|
| DE | 10 2005 060 217 | 7/2006 |
| DE | 102005060217 | 7/2006 |
| DE | 10 2012 222 570 | 6/2014 |
| DE | 102012222570 | 6/2014 |
| DE | 10 2016 217 252 | 3/2016 |
| DE | 11 2013 007 678 | 9/2016 |
| DE | 11 2013 007 683 | 12/2016 |
| DE | 10 2016 219 342 | 4/2018 |

OTHER PUBLICATIONS

Chinese Office Action Search Report for CN Application No. 201910411675.8, dated Sep. 2, 2020 with English Translation.

\* cited by examiner

FIG 4

VALVE ASSEMBLY AND PUMP WITH INTEGRATED VALVE FOR LUMBAR SUPPORT

CROSS-REFERENCE TO RELATED APPLICATIONS

The present application claims benefit of German Patent Application No. 10 2018 112 091.5, filed May 18, 2018, which is incorporated by reference herein.

TECHNICAL FIELD

The disclosure relates to a valve arrangement with a valve having valve housing, which encloses a valve chamber and has at least one valve opening. To actuate such a valve, an actuating element arranged inside the valve chamber is movable between a closing position to close the valve opening and an opening position to release the valve opening. Furthermore, the disclosure relates to a pump with a valve arrangement.

The movement of the actuating element between the opening and closing position can take place with the help of shape memory alloys (SMAs) that can have the shape of wires, for example. In this case, they are alloys that can exist in two different crystalline structures depending on their temperatures. At room temperature, a martensitic structure with a tetragonal, space-centered lattice is present, which starting at a transformation temperature of about 100° C. transforms into an austenitic structure with a cubic surface-centered lattice. Therefore, a wire made of such a shape memory alloy has the property of shortening due to the lattice transformation from a martensitic to an austenitic structure when heated up above the transformation temperature. In order to heat up the SMA element, current is usually applied to it, as a result of which it shortens and is thus able to move the actuating element.

BACKGROUND

A valve with a valve housing enclosing a pressure chamber is known, for example, from DE 10 2005 060 217, whereby a tappet is arranged inside the pressure chamber for opening and closing a valve opening. Here, an SMA element—electrically connected to a printed circuit board arranged inside the valve housing so current can be applied to it—actuates the tappet so it can move the valve opening. Since the SMA element is arranged inside the pressure chamber, it is directly exposed to the volume flow of the valve, i.e. to the air flowing in and out of the pressure chamber through the valve openings. In this case, the SMA element extends on both sides of the tappet, so that it is V-shaped.

A valve with an actuating element that includes a leaf spring is known from DE 10 2012 222 570 A1. The actuating element is actuated with an SMA element having an elongated design.

Pumps for seating comfort systems are known from US 2007/023089 or US 2016/363230A1, for example.

Such a valve or valve arrangement can be used in the area of automobile seats for filling media reservoirs, which can be fluid bubbles, especially air bubbles or air cushions. The known valves with only one actuating element can be used either for filling or emptying the bubble. Individually, they are not suitable for holding the pressure inside the bubble. To achieve this, a combination of two of the known valves is necessary. These valve arrangements consisting of two valves have a large structural size.

SUMMARY

It is therefore the task of the disclosed subject matter to specify a valve arrangement and a pump with such a valve arrangement, improved with regard to the aforementioned disadvantages.

The valve arrangement according to the disclosure includes a housing with a pump connection and a consumer connection, and furthermore includes a first actuator and second actuator, Wherein each actuator includes:
one base plate,
one actuating element with a sealing element in a first end section of the actuating element
one connecting element and
one SMA element, preferably arranged in U-shape,
wherein the actuating element with the base plate is at least partially superimposed and thus attached to the second end section of the actuating element,
wherein the connecting element is conductively connected to two points of the SMA element,
wherein the SMA element is connected in a middle section to the actuating element in such a way in the first end section, especially attached in a clamping way, that a shortening of the SMA element causes a stroke of the sealing element,
wherein the first and second actuator are arranged in mirror symmetry with regard to each other.

The SMA element is a band- or wire-shaped element made of a shape memory alloy.

Arranged in mirror symmetry is especially understood to mean that the actuating elements are arranged in mirror symmetry with regard to one another.

The SMA element is especially arranged in U-shape in order to reduce the structural size almost in half compared to a known V-shaped design. The SMA element can be U-shaped with a U-shaped arc. Alternately, it can also consist of two partial parts, for example, that are essentially U-shaped without a U-shaped arc. In the latter case, the middle section is understood to be a third and fourth end section that would have been attached to the U-shaped arc in a U-shape. To mount the SMA element, projections can be provided especially in the first section of the actuating element around which the SMA element extends, or on which the third and fourth end sections are mounted.

In an embodiment, the housing includes an intermediate housing, which subdivides the housing into an inlet and an outlet tract, whereby a channel going from the inlet to the outlet tract has been executed in the intermediate housing, fluidically connected to the consumer connection, whereby the first actuator forms an inlet valve with the first end of the channel and the second actuator forms an outlet valve with the opposite second end of the channel. In this embodiment, the first actuator forms an inlet valve through which air can be let in to a consumer connection, for example, so a bubble can be filled; the second actuator forms an outlet valve to vent the bubble. When the inlet and outlet valves are closed, a pressure holding function is achieved.

In another embodiment, the actuating element of the first and/or second actuator is preferably designed as stamped-bent part, and/or the base plate forms a stop for the actuating element.

Expediently, the actuating element has preferably a passage hole in the first end section, and the sealing element extends through the passage hole, mounted especially therein in a form-fitting way.

In an embodiment, the connecting element includes a printed circuit board or PC board or has circuit paths attached to a plastic board or a stamped grid. In a first alternative, the SMA element is in the middle section connected to the connecting element as first contact via the actuating element, which is conductively designed, and conductively connected to a second contact of the connecting element through the first and second end of the SMA element. Furthermore, SMA elements of adjacent actuators can be executed as a one-piece SMA element. In this embodiment, a continuous ground contact can be present, also connected to numerous actuators arranged beside one another, for example. In a second alternative, the actuating element is non-conductively connected to the SMA element and each one from the first and second end of the SMA element is conductively connected in each case to a first and second contact. In this embodiment, the actuating element can be manufactured from a non-conductive material. In an arrangement of several actuators beside one another, it is possible that in each case two SMA element ends of adjacent actuators share one contact.

The base plate can include connectors, especially press-fit pins, soldered crimps or brackets to hold the printed circuit board in place.

In a preferred embodiment, the printed circuit board and the base plate are arranged on opposite sides of the actuating element.

Moreover, the actuating element can have in the first end section a lateral wall extending perpendicularly to the actuating element to shield the SMA element from an air current. The lateral wall is at least arranged circumferentially in sections, especially in the first section of the actuating element.

Expediently, the SMA element is mounted on the printed circuit board in an area facing away from the first end section of the actuating element, especially through crimping, whereby the SMA element is preferably deflected before the mounting.

The actuating element can preferably be designed as flexible spring attached to the base plate in a torque-proof way or the actuating element can be a lever element made of a bending-resistant material attached to the base plate so it can swivel.

In the embodiment having the actuating element as flexible spring, the flexible spring has a bending-resistant area in the first end section and a middle elastic area, whereby the elastic area is preferably arranged at least partially between printed circuit board and base plate and/or the elastic area is pre-stressed.

In the embodiment having the actuating element as lever element, the lever element is expediently reset with a spring tension, whereby preferably the spring tension is generated by a leaf spring or coil spring, which acts against the printed circuit board or the valve housing.

Expediently, the valve arrangement includes at least two, especially at least three, first and second actuators, which are especially arranged beside one another.

The pump according to the invention is a pump for a seating comfort function and includes a valve arrangement according to the invention.

In this case, several—particularly three—valve arrangements are expediently arranged beside one another.

Expediently, the pump is housed in a housing firmly attached to a valve housing, whereby a lid of the valve housing has electrical and pneumatic connections, whereby a printed circuit board with mounted actuator assembly units is incorporated in the housing.

BRIEF DESCRIPTION OF THE DRAWINGS

The invention will be explained below in more detail, also with respect to additional characteristics and advantages, by describing the embodiments and with reference to the enclosed drawings, which show in each case in a schematic sketch.

DETAILED DESCRIPTION

Figure 1:
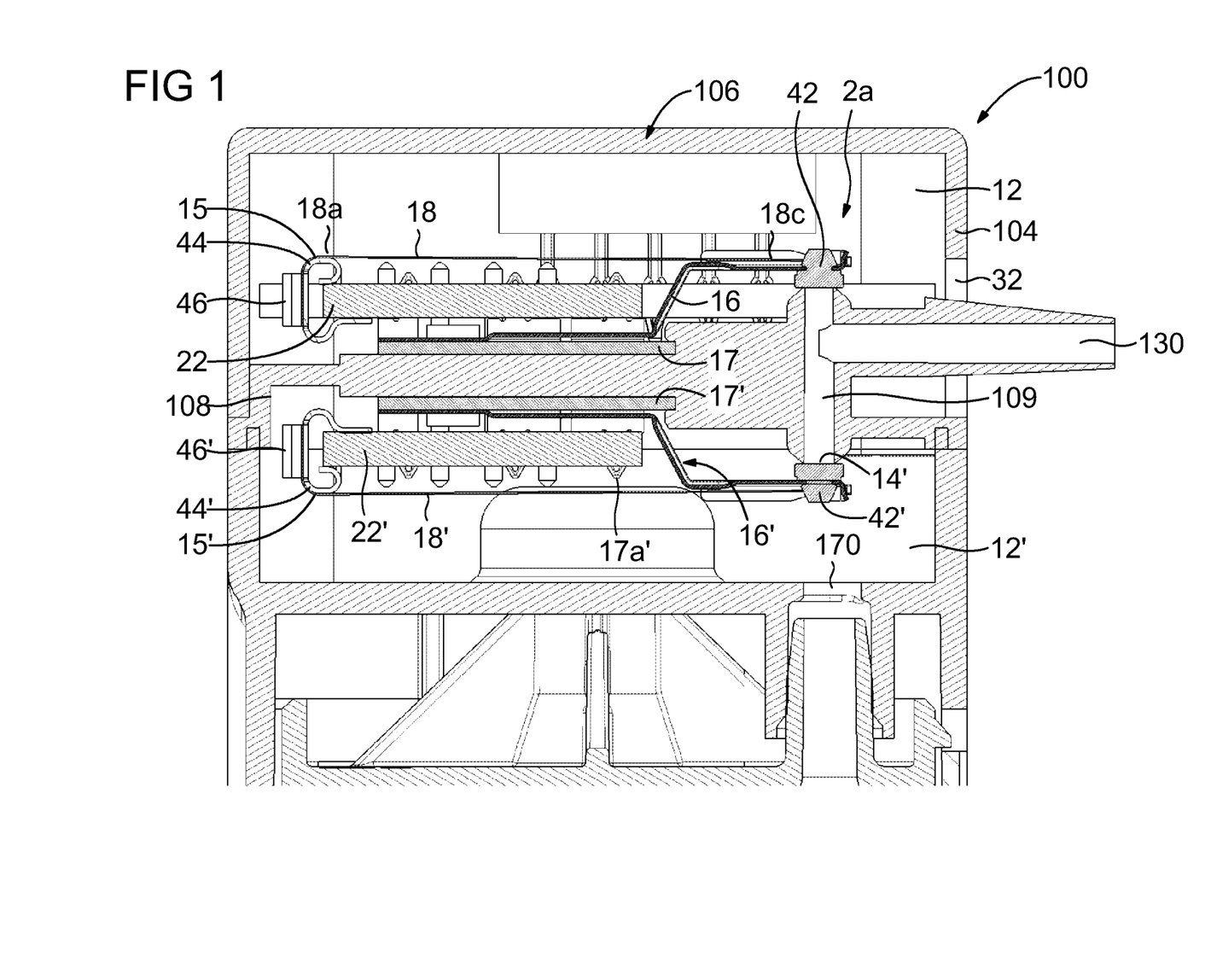
FIG. 1 is a sectional view of a valve arrangement.

FIG. 1 shows a valve arrangement 100. The valve arrangement 100 is housed in a housing 104, which includes a housing lid 106 and a housing bottom 110. A pressure connection 170 is incorporated in the housing bottom 110. Moreover, the housing 104 has an intermediate housing 108. Here, an opening 32 to the atmosphere is arranged around a consumer connection 130.

Two valve elements 2a, 2b are housed in the housing 104. The valve elements 2a, 2b, which include in each case an actuating element 16, 16', are arranged on a base plate 17, 17'. To actuate one of the valve elements 2a, 2b, the corresponding SMA element 18, 18' is shortened when current is applied and the sealing element 42, 42' is brought from a closing position to an opening position. To save space, the printed circuit boards 22, 22' are in each case arranged between the actuating element 16, 16' and the SMA element 18, 18'.

The valve openings 14, 14' are connected to one another through a channel 109, which is arranged in the intermediate housing 108. The consumer connection 130 extends from the channel 109.

The valve element 2b is configured as an inlet valve. In order to fill the bubble connected to the consumer connection 130, pressurized air that reaches the housing 104 through the pressure connection 170 is introduced into the channel 109 from a valve chamber 12' through the valve opening 14'. So this can be done, the actuating element 16' is in an opening position with the sealing element 42'. In this case, the actuating element 16 of the valve element 2a is in a closing position.

If both valve elements 2a and 2b are closed, the pressure is maintained in a bubble connected to the consumer connection 130.

If the bubble should be emptied, the valve element 2b remains in the closing position and the valve element 2a is opened by bringing the actuating element 16 in an opening position with the sealing element 42. The air can be drawn out from the valve chamber 12 through the opening 32 to the atmosphere.

Figure 2A:
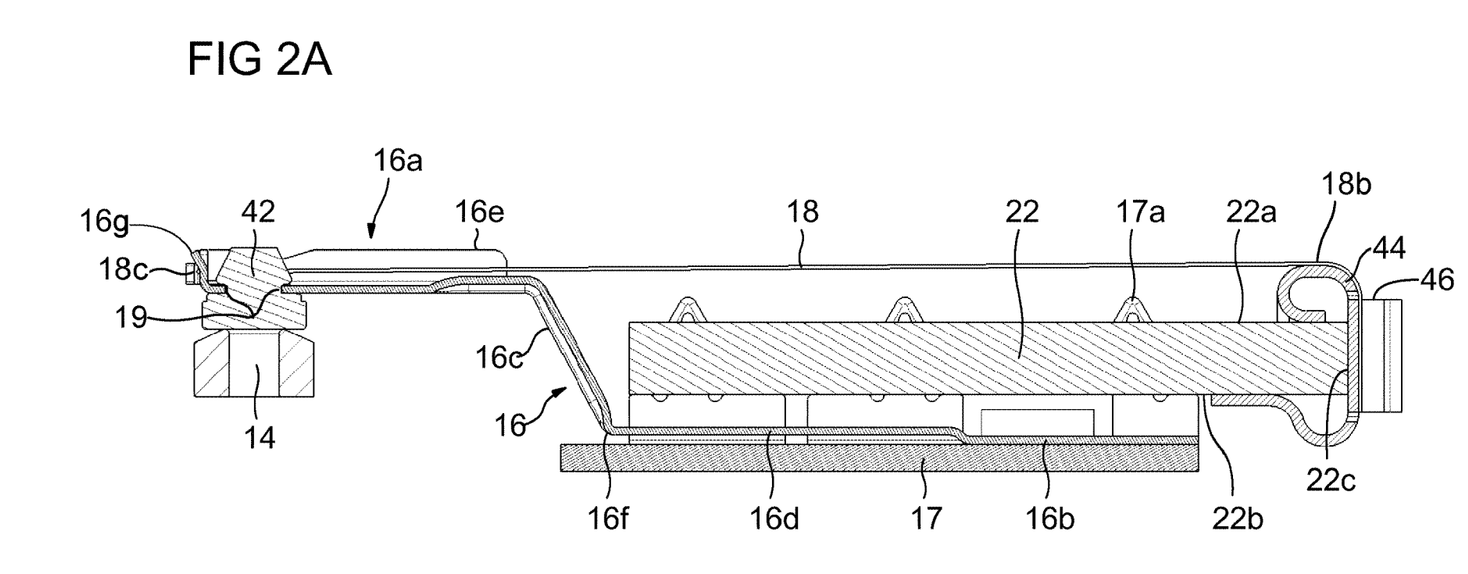
FIG. 2A is a sectional view of an actuator according to a first embodiment in a closing position.

FIG. 2A shows a sectional view of an actuator according to a first embodiment. The actuator includes an actuating element 16 arranged on a base plate 17 and attached to it. The actuating element is two-dimensionally connected to the base plate 17 in the second end section 16b.

The actuating element 16 has a first end section 16a and a second end section 16b. Between both end sections 16a and 16b extends a middle section of the actuating element 16c, in which the actuating element 16 is bent in steps and includes an elastic section 16d. The elastic section 16d is arranged above the base plate 17. However, the elastic section 16d and the base plate 17 are arranged in such a way with regard to one another that the elastic section 16d can be bent. A bending of the elastic section 16d is limited by a stop of the actuating element 16 in a stop area of the actuating element 16f. A pre-stress can be especially achieved by bending the elastic section 16d and mounting on the base plate 17.

A sealing element 42 for closing and releasing a valve opening 14 has been arranged in the first end section of the actuating element 16a. For this, the first end section of the actuating element 16a has a passage hole 19, e.g. a bore hole, in which the sealing element 42 is arranged in a form-fitting way.

Furthermore, the first end section of the actuating element 16a has lateral walls 16e that extend, at least in sections, circumferentially perpendicular from the first end section of the actuating element 16a.

The base plate 17 has connectors 17a for connecting a printed circuit board 22. The printed circuit board 22 is arranged on an opposite side of the actuating element 16 with the connectors 17a. Here, the connectors 17a are designed as a press-fit pin.

A bracket that includes a crimp connector 44 is arranged on a side of the printed circuit board 22—which is the back side of the printed circuit board 22c—that faces away from the first end section of the actuating element 16a. The crimp connector 44 has a seat 46. By means of two crimp connectors 44 arranged parallel to one another, an SMA element 18 is held on a first end 18a and a second end 18b. The SMA element 18 extends in U-shape from the crimp connector 44 to the first end section 16a of the actuating element. The SMA element 18 is attached in such a way with a middle section of the SMA element 18c to the first end section 16a that a shortening of the SMA element 18 creates a stroke of the actuating element 16 from a closing position (cf. FIG. 2A) to an opening position. In this embodiment, the crimp connector 44 is expediently designed as ground contact for the SMA element 18, especially for both ends 18a, 18b. In a middle section 18c above the actuating element 16, the SMA element 18 makes contact with the printed circuit board 22 as second contact, especially through a projection 16g of the actuating element.

Figure 2B:
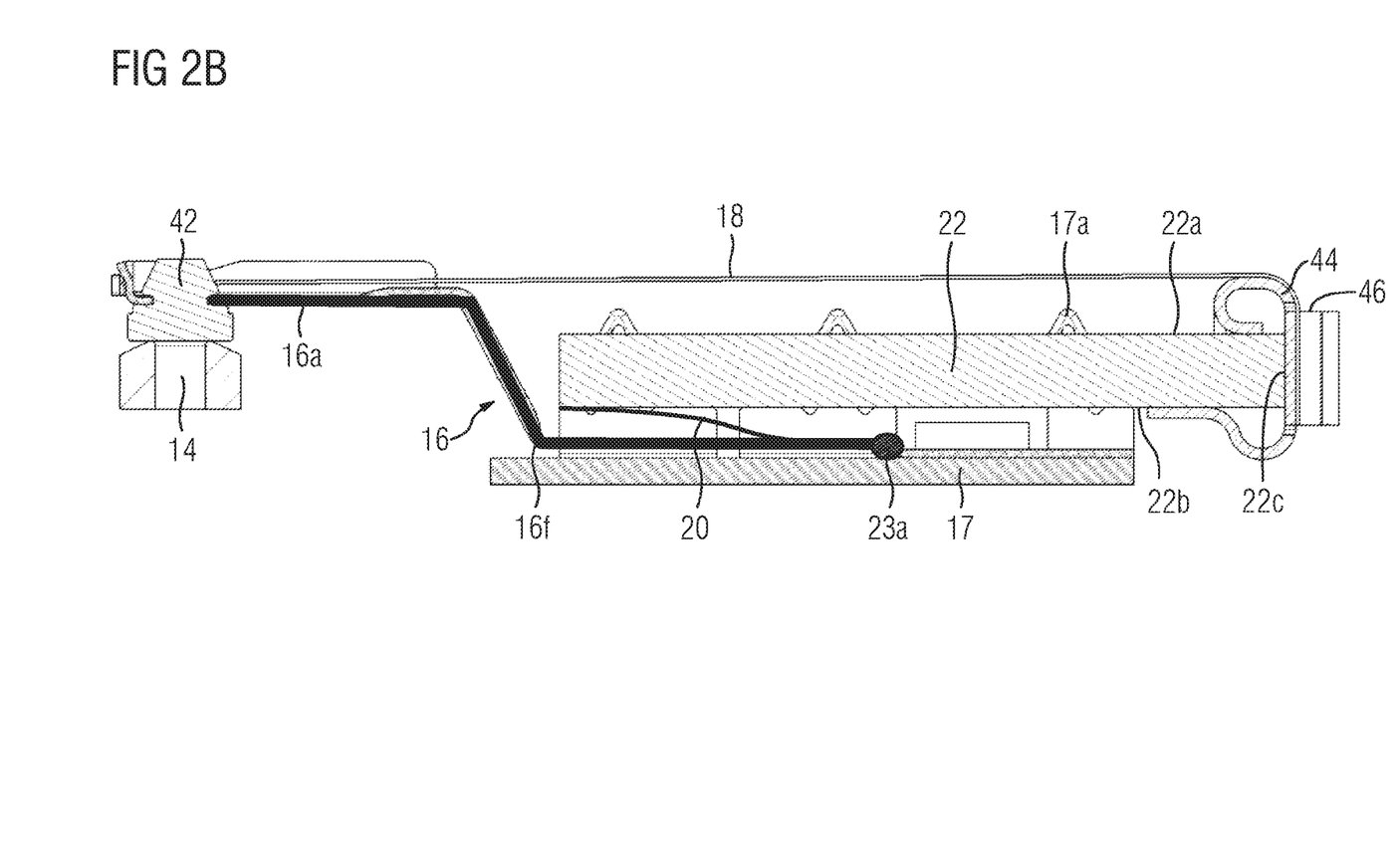
FIG. 2B is a sectional view of an actuator according to a second embodiment.

FIG. 2B shows a sectional view of a second embodiment of an actuator. In this embodiment, the actuating element 16 is rigidly executed. In a second end section 16b of the actuating element, the base plate 17 and the actuating element 16 are joined with a hinge 23a. The position of the hinge 23a on the base plate 17 can be arranged under or adjacent to the printed circuit board 22. If the position of the hinge 23a is adjacent to the printed circuit board 22, the actuating element 16 expediently has only one angle. To reset the actuating element to a closing position, a reset actuating element 20 is provided as leaf spring in the embodiment shown, whereby the leaf spring presses against a bottom side 22b of the printed circuit board. The reset actuating element 20 can be executed as one piece with the actuating element 16. Expediently, the SMA element 18 is in this embodiment conductively connected to a first contact in the area of the crimp connector 44 with a first end 18a, and to a second contact in the area of the crimp connector 44 with a second end 18b.

Figure 2C:
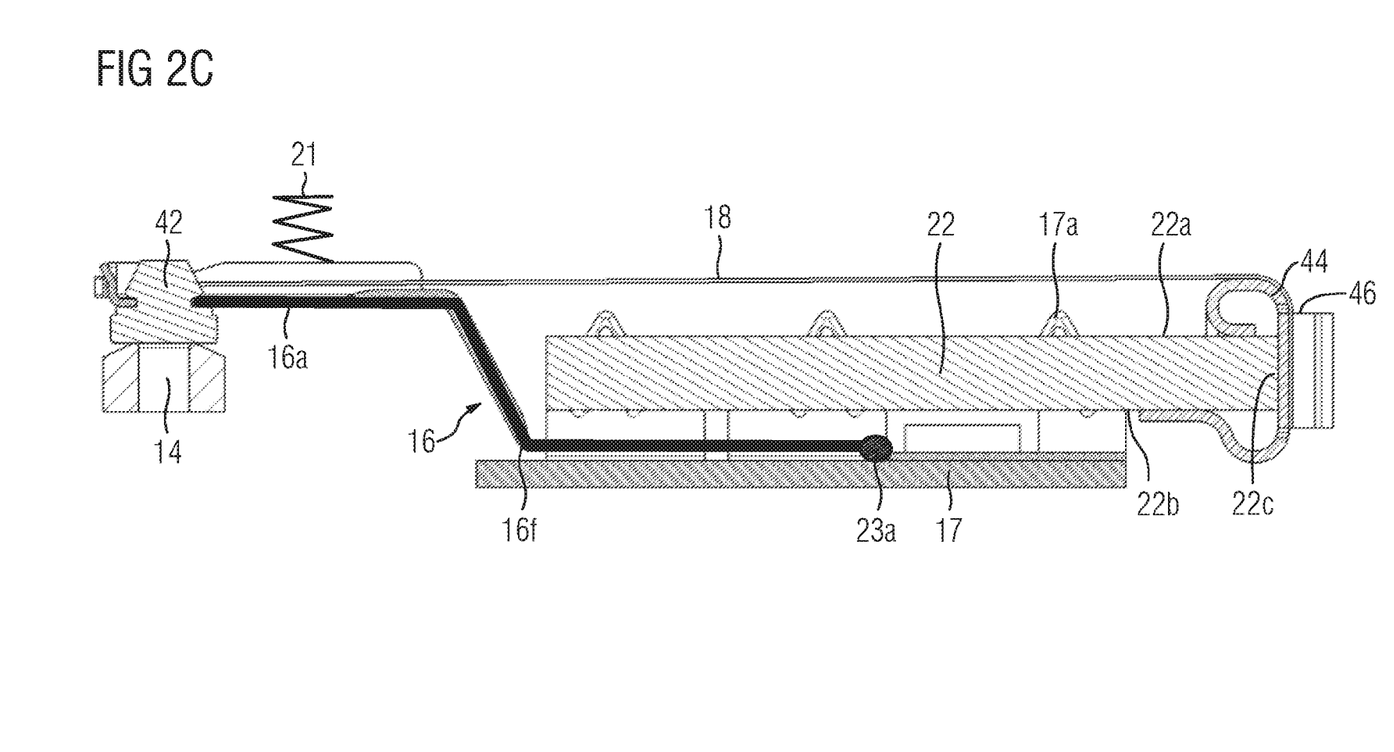
FIG. 2C is a sectional view of an actuator according to a third embodiment.

FIG. 2C shows a third embodiment of the actuator. In the third embodiment, the reset actuating element 20 has been replaced by a reset actuating element 21. The reset actuating element 21 is designed as a spiral spring, which expediently acts against a valve housing wall. Alternative positions or spring designs are possible for resetting the actuating element.

Figure 2D:
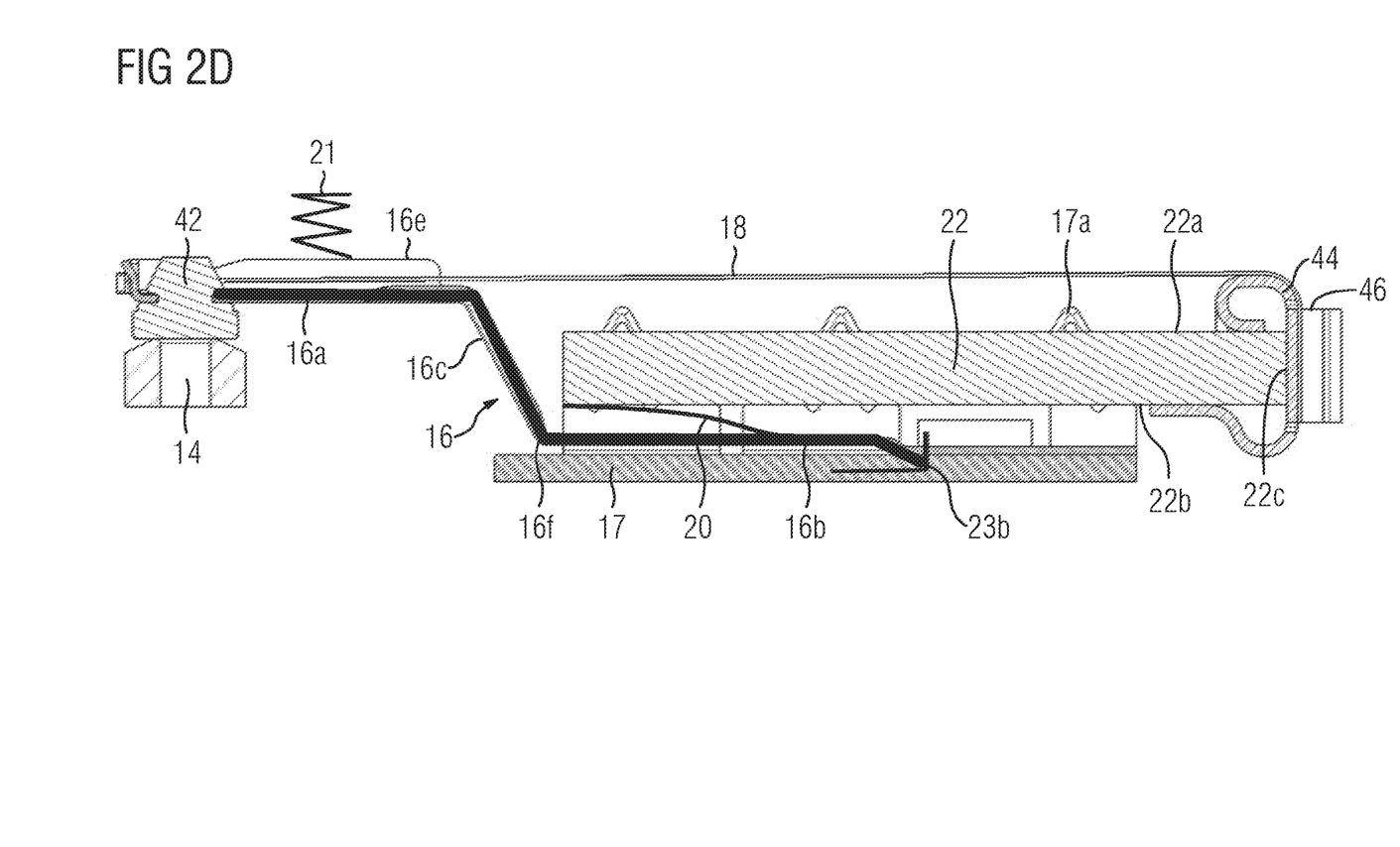
FIG. 2D is a sectional view of an actuator according to a fourth embodiment.

FIG. 2D shows a sectional view of the fourth embodiment of an actuator. The fourth embodiment differs from the second and third embodiment in that the actuating element 16 is connected to the base plate through a bearing 23b in a second end section 16b. The bearing 23b can be especially designed as an angle or notch, in which the second end section 16b of the actuating element is received, whereby as in the second embodiment, the length of the second end section of the actuating element and thus the position of the bearing 23b along the base plate 17 can have a different design. In the fourth embodiment, either a reset actuating element 20 or a reset actuating element 21 is provided.

Figure 3:
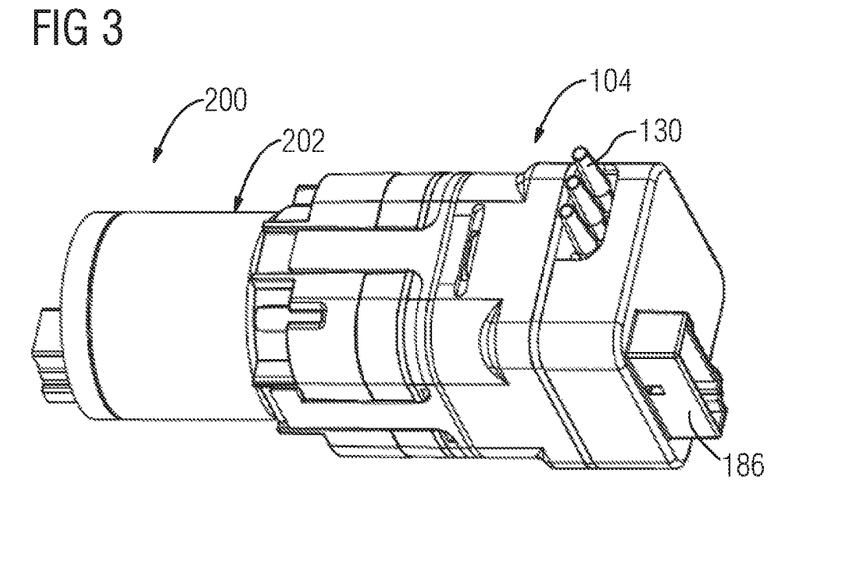
FIG. 3 is a pump with the valve arrangement.
Figure 4:
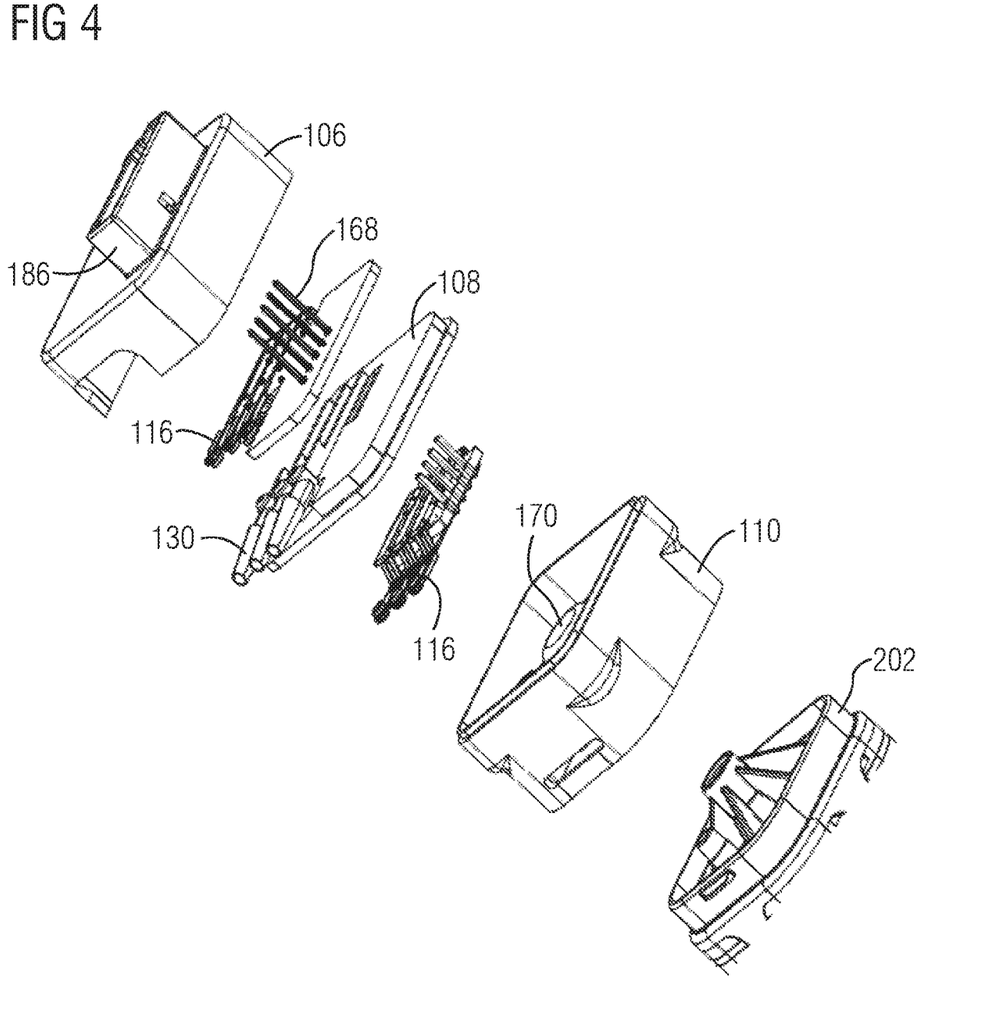
FIG. 4 is a pump with the valve arrangement in an exploded view.

FIGS. 3 and 4 show a pump mechanism 200 for a lumbar support function of an automobile seat. FIG. 3 shows an exterior view in which a pump housing 202 is attached to a valve housing 104. The pump housing 202 encloses a pump. Here, the valve housing 104 has three consumer connections 130 and an electronics area 186. A cross section of the pump housing 202 and the valve housing 104 is matched to one another.

FIG. 4 shows an exploded view of the pump mechanism from FIG. 3. The housing bottom 110 of the valve arrangement 100 has been placed on top of the pump housing 202. The housing bottom has a pressure connection 170 in the central part. By means of an intermediate housing 108, printed circuit boards 122 with plug connectors 168 and three actuating elements 116 each are connected on both sides as structural unit. Three consumer connections 130 are arranged in the intermediate housing. In each case, two actuating elements 116 opposite one another form a pair consisting of an outlet and an inlet valve, and are connected to a consumer connection 130. Furthermore, the intermediate housing 108 is attached to the housing lid 106. The housing lid also has an electronics area 186 through which the plug connectors 168 can be connected. With the pump according to the invention, for example, three bubbles for a lumbar support of an automobile seat can be individually filled or vented.

LIST OF REFERENCE CHARACTERS 2a, 2b Valve
12, 12' Valve chamber
14, 14' Valve opening
15,15' Connecting element
16, 16' Actuating element
16a First end section of the actuating element
16b Second end section of the actuating element
16c Middle section of the actuating element
16d Elastic section of the actuating element
16e Lateral walls of the actuating element
16f Stop area of the actuating element
16g Projection
16h Clamping device
17 Base plate 17a Connector
18, 18' SMA element
18a First end of the SMA element
18b Second end of the SMA element
18c Middle section of the SMA element
19 Passage hole
20 First reset actuating element
21 Second reset actuating element
22, 22', 122 Printed circuit board
22a Top side of the printed circuit board
22b Bottom side of the printed circuit board
22c Back side of the printed circuit board
23a Hinge
23b Bearing
32 Opening
42, 42' Sealing element
44 Crimp connector
46 Seat of the crimp connector
100 Valve arrangement
104 Housing
106 Housing lid
108 Intermediate housing
109 Channel
110 Housing bottom
116 Actuating element
130 Consumer connection
168 Plug connector
170 Pressure connection
186 Electronics area

The invention claimed is:

1. A valve arrangement comprising:
a housing with a pump connection and a consumer connection, the housing including an intermediate housing subdividing the housing into an inlet section and an outlet section, the intermediate housing defining a channel from the inlet section to the outlet section, the channel being fluidically connected to the consumer connection;
a first actuator, the first actuator forming an inlet valve with a first end of the channel; and
a second actuator arranged symmetrically to the first actuator, the second actuator forming an outlet valve with a second end of the channel opposite the first end of the channel;
each of the first actuator and the second actuator including:
one base plate;
one actuating element having a first end section, a second end section, and a sealing element in the first end section;
one connecting element; and
one SMA element having a U-shape with a first end, a second end, and a middle section between the first end and the second end;
wherein the actuating element is at least partially arranged on and connected to the base plate via the second end section;
wherein the connecting element is conductively connected to two points of the SMA element; and
wherein the middle section of the SMA element is connected to the first end section of the actuating element so that a shortening of the SMA element causes a stroke of the sealing element.

2. The valve arrangement according to claim 1, wherein the base plate includes a stop for contacting the actuating element of at least one of the first actuator and the second actuator.

3. The valve arrangement according to claim 1, wherein the actuating element of at least one of the first actuator and the second actuator includes a stepped configuration, and wherein the base plate includes a stop for contacting the actuating element.

4. The valve arrangement according to claim 1, wherein the actuating element of at least one of the first actuator and the second actuator defines a passage hole in the first end section, and the sealing element extends through and is attached within the passage hole via a form-fit.

5. The valve arrangement according to claim 1, wherein each connecting element includes a printed circuit board, and wherein one of:
the middle section of each SMA element connected to the connecting element as a first contact via the actuating element, the actuating element being conductive, and the first end and the second end of each SMA element is conductively connected as a second contact of the connecting element; and
the actuating element is not conductively connected to each SMA element and the first end and the second end of each SMA element is conductively connected respectively as a first contact and a second contact.

6. The valve arrangement according to claim 5, wherein each base plate includes connectors to fix the respective printed circuit board in place.

7. The valve arrangement according to claim 6, wherein each respective printed circuit board and the base plate are arranged on opposite sides of the respective actuating element.

8. The valve arrangement according to claim 1, wherein each actuating element has a lateral wall extending perpendicularly to a longitudinal axis of the actuating element in the respective first end section shielding the respective SMA element from an air current.

9. The valve arrangement according to claim 5, wherein each SMA element is mounted on the printed circuit board via a crimp connector of the connecting element in an area facing away from the first end of the respective actuating element, and wherein each SMA element is mounted in a pre-deflected condition.

10. The valve arrangement according to claim 5, wherein each actuating element includes a flexible spring attached in a torque-proof way to the respective base plate.

11. The valve arrangement according to claim 10, wherein the flexible spring includes a bending-resistant area and a middle elastic area in a first end, and wherein at least one of: (a) the middle elastic area is arranged at least partially between the respective printed circuit board and the respective base plate, and (b) the middle elastic area is pre-stressed.

12. The valve arrangement according to claim 1, wherein the valve arrangement includes at least two of each of the first actuator and the second actuator, each first actuator being arranged beside a second actuator.

13. The valve arrangement according to claim 12, wherein the valve arrangement includes at least three of each of the first actuator and the second actuator.

14. A pump mechanism having at least one valve arrangement according to claim 1, including a seating comfort adjustment pump.

15. The pump mechanism according to claim 14, wherein at least two of the valve arrangements are arranged beside one another.

16. The pump mechanism according to claim 14, wherein at least three of the valve arrangements are arranged beside one another.

17. The valve arrangement according to claim 1, wherein the actuating element includes a lever element made of a bending resistant material swivelably attached to the base plate.

18. The valve arrangement according to claim 17, wherein the lever element is reset with a spring tension generated by a reset actuating element including a spring acting against one of a printed circuit board or a valve housing.

* * * * *

UNITED STATES PATENT AND TRADEMARK OFFICE
CERTIFICATE OF CORRECTION

PATENT NO.       : 10,948,097 B2
APPLICATION NO.  : 16/413844
DATED            : March 16, 2021
INVENTOR(S)      : Dörfler et al.

It is certified that error appears in the above-identified patent and that said Letters Patent is hereby corrected as shown below:

On the Title Page

Item (73) "Assignee: Akfmeier Präzision SE..." should read --Assignee: Alfmeier Präzision SE...--

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*